United States Patent
Sahara et al.

(10) Patent No.: US 6,311,660 B1
(45) Date of Patent: Nov. 6, 2001

(54) ROLLING-CONTACT CYLINDRICAL ELEMENT

(75) Inventors: Juntaro Sahara; Shinichi Natsumeda, both of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/662,901

(22) Filed: Sep. 15, 2000

(30) Foreign Application Priority Data

Sep. 16, 1999 (JP) .................................................. 11-262145

(51) Int. Cl.⁷ ........................................................ F02B 1/00
(52) U.S. Cl. ...................... 123/90.42; 123/90.5; 384/565; 384/568; 29/898.068; 74/569
(58) Field of Search ................................ 123/90.42, 90.5, 123/90.51, 508; 384/91, 565, 568; 74/569; 29/898.04, 898.06, 898.068

(56) References Cited

U.S. PATENT DOCUMENTS

| | | | |
|---|---|---|---|
| 4,456,313 | * | 6/1984 | Hartnett et al. ....................... 384/565 |
| 4,557,613 | * | 12/1985 | Tallian et al. ......................... 384/568 |
| 4,802,775 | * | 2/1989 | Takata .................................. 384/450 |
| 5,054,440 | * | 10/1991 | Kadokawa ........................... 123/90.5 |
| 5,979,384 | * | 11/1999 | Oka et al. .......................... 123/90.42 |
| 6,086,261 | * | 7/2000 | Nakagawa et al. .................. 384/571 |

FOREIGN PATENT DOCUMENTS 5-36005   5/1993  (JP) .

OTHER PUBLICATIONS

Johns, P.M. et al, "Roller Bearings Under Radial and Eccentric Loads", Tribology International, Jun. 1981, vol. 14, pp. 131–136.
Halsey, R.V., "A Review of Rolling Bearing Engineering", Ball Bearing Journal 230, Jun. 1987, pp 1–10.
Harris, Tedric A., "Rolling Bearing Analysis", John Wiley & Sons, Inc., 1991, pp. 191–201 & 708–713.

* cited by examiner

Primary Examiner—Weilun Lo
(74) Attorney, Agent, or Firm—Sughrue, Mion, Zinn, Macpeak & Seas, PLLC

(57) ABSTRACT

In a case where crowning is provided on a contact surface of a tappet roller by the combination of, for example, two circular arcs, a logarithmic crowning is determined in which an edge load does not occur in the bearing pressure even if its inclination with respect to the cam is $5/1,000$ or thereabouts, and a crowning profile is set between two logarithmic crownings. In addition, the crowning profile is defined so as to be present between the logarithmic crownings in a case where the axial position x with the center in the direction of a bus set as an origin is at a position 0.85-fold and at a position 1.0-fold the half $L_e$ of the effective contact length, respectively.

4 Claims, 6 Drawing Sheets

$L_e$: 1/2 (mm) OF THE EFFECTIVE CONTACT LENGTH OF TAPPET ROLLER
x: DISTANCE (mm) FROM THE CENTER OF THE CONTACT PORTION OF THE TAPPET ROLLER
δ: AMOUNT (mm) OF FALL AT x
$δ_{end}$: AMOUNT (mm) OF FALL AT AN END PORTION OF THE EFFECTIVE CONTACT LENGTH Le: 1/2 (mm) OF THE EFFECTIVE CONTACT LENGTH OF TAPPET ROLLER x: DISTANCE (mm) FROM THE CENTER OF THE CONTACT PORTION OF THE TAPPET ROLLER $\delta$: AMOUNT (mm) OF FALL AT x $\delta$ end: AMOUNT (mm) OF FALL AT AN END PORTION OF THE EFFECTIVE CONTACT LENGTH $\delta_1 = 0.04$
$\delta_2 = 0.09$
UNIT: mm $\delta_1 = 0.035$
$\delta_2 = 0.07$
UNIT: mm

ROLLING-CONTACT CYLINDRICAL ELEMENT

BACKGROUND OF THE INVENTION

1. Field of the Invention

The present invention relates to a rolling-contact cylindrical element such as a tappet roller for use as a driven part such as a fuel injector, an intake or exhaust valve, or the like in an internal combustion engine.

2. Description of the Related Art

Conventionally, iron-based alloys such as a bearing steel and a tool steel, ceramics such as silicon nitride, and the like have been used as a rolling-contact cylindrical element such as a tappet roller. However, for example, there is the following problem. Because of the difference of parallelism between a cam and a contact surface, the deflection of the shaft of a fuel injection apparatus and intake and exhaust valves, there occurs partial contact of the cam with an end portion of the tappet roller and bearing pressure between the tappet roller and the cam increases. As a result, there occurs unstable rotation and the seizure, wear, pitching, and exfoliation of the contact surface.

Accordingly, a technique has been proposed to provide the contact surface of the tappet roller with crowning so as to alleviate the aforementioned partial contact due to a difference in parallelism and the deflection of a shaft, thereby suppressing the rise in bearing pressure and obtaining stable rotation. The shape of the bus of the crowning includes a so-called full crowning, a trapezoidal crowning, and a crowning combining circular arcs. For example, JP-U-5-36005 proposed that in order to overcome the problems of the trapezoidal crowning and the full crowning, a circular arc crowning having a large radius of curvature is provided in a central portion of the contact surface, while a circular arc crowning having a small radius of curvature is provided at an end portion thereof.

However, with tappet rollers in recent years, the bearing pressure with the cam is made high so as to effect control with higher accuracy by transmitting the rotation of the cam accurately to the fuel injector or the like. In addition, since fuel injection is effected under higher pressure as a countermeasure for controlling exhaust gases, the surface of contact with the cam has come to be subjected to extremely high contact pressure. For this reason, with the aforementioned crownings, even if they are able to transmit the rotation, excessively large bearing pressure occurs at the end portion, i.e., edge load occurs, due to misalignment during assembly, i.e., an inclination. Consequently, there are problems in that wear is promoted, variations occur in the transmission of rotation, the performance of the internal combustion engine declines, and the rolling life of the tappet roller decreases due to the exfoliation of the contact surface.

FIG. 9 shows a circular arc crowning of a general tappet roller. In this example, a half Le of the effective contact length is 8 mm, a circular arc crowning with a radius of curvature of 2,000 mm is provided in its central portion, a circular arc crowning with a radius of curvature of 800 mm is provided in a 3-mm section ranging from an axial position, x=5 mm, with a center in the direction of the bus set as an origin to the end in such a manner as to continue therefrom. FIG. 10 shows the distribution of bearing pressure when the tappet roller of this crowning shape and the cam are brought into contact with each other with an inclination of 5/1,000. The abscissa in the drawing shows the ratio of the aforementioned axial position x with the center in the direction of the bus set as the origin to the half $L_e$ of the effective contact length, while the ordinate shows the ratio of bearing pressure P to Hertz's maximum bearing pressure $P_H$. However, in this case, it is assumed that the Hertz's maximum bearing pressure is defined as a maximum contact bearing pressure occurring in the center of the contact surface when circular cylinders are brought into contact with each other under ideal conditions in which there is no misalignment and no edge load. Then, as is apparent from the drawing, an extreme edge load occurs in the conventional case.

SUMMARY OF THE INVENTION

It is an object of the present invention to provide a rolling-contact cylindrical element such as a tappet roller capable of suppressing an increase in the bearing pressure and suppressing and preventing wear and exfoliation and of ensuring the performance of the internal combustion engine by clarifying specific numerical values of the shape of the circular-arcs combining crowning and numerical values of the shape of the partial crowning.

According to the present invention, a rolling-contact cylindrical element which abuts against a mating element having a surface with a radius of curvature and is axially supported rotatably so as to come into rolling contact with the mating element at its outer peripheral surface, wherein a crowning is provided on the outer peripheral surface for abutment against the mating element, and if it is assumed that a half of the effective contact length of the outer peripheral surface in a direction of a bus of the outer peripheral surface is $L_e$, a shape of the bus of the crowning is provided such that an amount δ of fall of the crowning at an axial position x toward an axial end of the rolling-contact cylindrical element from a center in a direction of the bus of the abutment surface of the rolling-contact cylindrical element set as an origin satisfies a following formula (1):

If $-L_e \leq x \leq L_e$, $$-\frac{8.6 \times 10^6}{E'^2} \cdot \frac{r_1 \cdot r_2}{r_1 + r_2} \ln\left\{1 - \left(1 - \frac{1780}{E'} \cdot \frac{r_1 \cdot r_2}{r_1 + r_2} \cdot \frac{1}{L_e}\right) \cdot \left(\frac{x}{L_e}\right)^2\right\} \leq \delta \leq -\frac{45 \times 10^6}{E'^2} \cdot \frac{r_1 \cdot r_2}{r_1 + r_2} \ln\left\{1 - \left(1 - \frac{3650}{E'} \cdot \frac{r_1 \cdot r_2}{r_1 + r_2} \cdot \frac{1}{L_e}\right) \cdot \left(\frac{x}{L_e}\right)^2\right\} \quad (1)$$

where, $1/E' = (1-v_1^2)/E_1 + (1-v2^2)/E_2$ $E_1$: modulus of longitudinal elasticity of the material of the rolling-contact cylinder (MPa)

$E_2$: modulus of longitudinal elasticity of the material of the mating element (MPa)

$v_1$: Poisson's ratio of the material of the rolling-contact cylinder $v_2$: Poisson's ratio of the material of the mating element $r_1$: outer radius of the rolling-contact cylindrical element of the mating surface abutting against the mating element (mm)

$r_2$: minimum value of the radius of curvature of a projection portion of the mating element at its outer peripheral surface (mm)

ln: natural logarithmic function

In the present invention, as a result of analysis of the bearing pressure, a known logarithmic crowning (thesis by P. M. Johns and R. Gohar "Roller bearings under radial and eccentric loads" TRIBOLOGY International, vol. 14, 1981, pp. 131–136) was determined in which even if an inclination of 5/1,000 or thereabouts has occurred, an excessive increase in the bearing pressure, i.e., the so-called edge load, does not occur. However, although the logarithmic crowning theoretically exhibits a long life, it is difficult to fabricate. Therefore, by focusing attention on the fact that a circular arc crowning also has a long life if its shape is close to a logarithmic crowning, the amount of fall of the crowning at $\pm L_e$ from the center of the roller contact surface, i.e., up to both end points of the contact surface, is set between two logarithmic crowning profiles.

In addition, in the rolling-contact cylindrical element which abuts against a cam of a camshaft and is axially supported rotatably, a crowning is provided on a surface of contact with the cam, and if it is assumed that a half of the effective contact length of the contact surface in a direction of a bus of the contact surface is $L_e$, the shape of the bus of the crowning may be provided such that an amount $\delta$ of fall of the crowning at an axial position x with a center of the contact surface set as an origin satisfies a following formula:

If $x=\pm 0.85 L_e$, $$-\frac{8.6 \times 10^6}{E'^2} \cdot \frac{r_1 \cdot r_2}{r_1 + r_2} \ln\left(0.2775 + \frac{1290}{E'} \cdot \frac{r_1 \cdot r_2}{r_1 + r_2} \cdot \frac{1}{L_e}\right) \leq \quad (2\text{-}1)$$

$$\delta \leq -\frac{45 \times 10^6}{E'^2} \cdot \frac{r_1 \cdot r_2}{r_1 + r_2} \ln\left(0.2775 + \frac{2640}{E'} \cdot \frac{r_1 \cdot r_2}{r_1 + r_2} \cdot \frac{1}{L_e}\right)$$

If $x=\pm L_e$, $$-\frac{8.6 \times 10^6}{E'^2} \cdot \frac{r_1 \cdot r_2}{r_1 + r_2} \ln\left(\frac{1780}{E'} \cdot \frac{r_1 \cdot r_2}{r_1 + r_2} \cdot \frac{1}{L_e}\right) \leq \quad (2\text{-}2)$$

$$\delta \leq -\frac{45 \times 10^6}{E'^2} \cdot \frac{r_1 \cdot r_2}{r_1 + r_2} \ln\left(\frac{3650}{E'} \cdot \frac{r_1 \cdot r_2}{r_1 + r_2} \cdot \frac{1}{L_e}\right)$$

It should be noted that in the above-described Formulae 2-1 and 2-2, $0.85L_e$ and $1.0L_e$ are substituted for the axial position x with the center of the contact surface set as the origin in the above-described Formula 1. The reason for specifically setting $0.85L_e$ and $1.0L_e$ as the axial position x with the center of the contact surface set as the origin is as follows. Namely, due to the nature that the edge load is likely to occur not in the vicinity of the center of the contact surface of the rolling-contact cylindrical element but at a position closer to an end portion, if the amounts of fall at two points on a bus of the contact surface are defined in a curve connecting a plurality of circular arcs, the crowning profile can be roughly defined. As the result of analysis, it was clarified that the life becomes long when the position x from the center on the bus of the contact surface passes the range of a favorable logarithmic crowning shape at the positions of $0.85L_e$ and $1.0L_e$. It should be noted that it is evident that, in the curve connecting the circular arcs, if gate positions are provided at two points close to the end, the curve becomes close to a logarithmic curve.

PREFERRED EMBODIMENTS OF THE INVENTION

Figure 1:
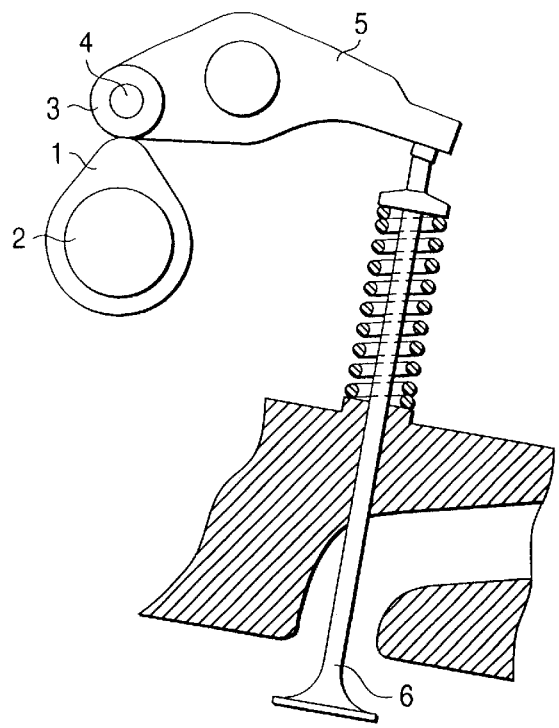
FIG. 1 is an explanatory diagram of a cam, a rocker arm, and a valve and illustrates an embodiment of a tappet roller in accordance with the present invention.

Hereafter, referring to the drawings, a description will be given of an embodiment of the invention. Here, a tappet roller is mainly described as a preferred embodiment of a rolling-contact cylindrical element according to the present invention.

FIG. 1 shows an embodiment of a tappet roller in accordance with the invention, and illustrates the state of a cam, a rocker arm, and a valve which make up an intake or exhaust valve of an internal combustion engine. Some cams 1 (in FIG. 1, only one cam is shown) are formed on a camshaft 2 which is rotated in synchronism with an unillustrated crankshaft. A rocker arm 5 swings along the profile of the cam surface of each cam 1, and presses a stem of a valve 6 so as to open and close the valve 6. Then, a tappet roller 3 which is axially supported rotatably by a roller shaft 4 is attached to a portion of the rocker arm 5 which comes into contact with the cam surface of the cam 1. An outer peripheral surface of the tappet roller 3 abuts against the cam surface of the cam 1.

Figure 2:
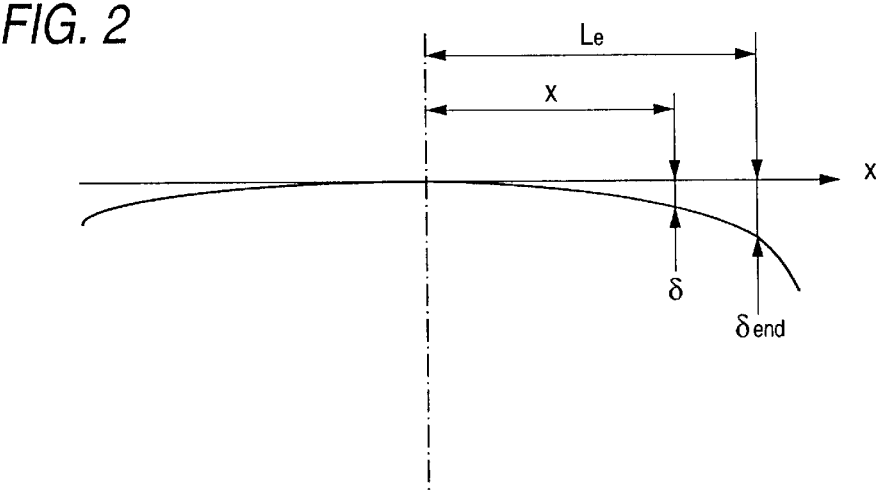
FIG. 2 is an explanatory diagram illustrating the details of a crowning profile of the tappet roller.

FIG. 2 shows the shape of the bus of the outer peripheral surface (contact surface) of the tappet roller 3, i.e., the shape of the crowning. This tappet roller is formed of a bearing steel, and in terms of its size the outer diameter is 40 mm, the inner diameter is 20 mm, and the effective contact length is 16 mm. Accordingly, the above-described half $L_e$ of the effective contact length is 8 mm. Meanwhile, the material of the cam 1 is also a bearing steel, and a minimum value of the radius of curvature of its outer diameter is 25 mm. In addition, in the direction of the bus of the tappet roller 3, the axial position with the center as an origin is set as x, and the amount of fall of the crowning at that position x is set as $\delta$. In addition, the amount of fall of the crowning in a case where the axial position x is at an end of $L_e$ which is a half of the effective contact length, i.e., at an end point in the effective contact length is expressed as $\delta_{end}$. Generally, the closer to the end point, the greater the amount of fall of the crowning.

Figure 3A:
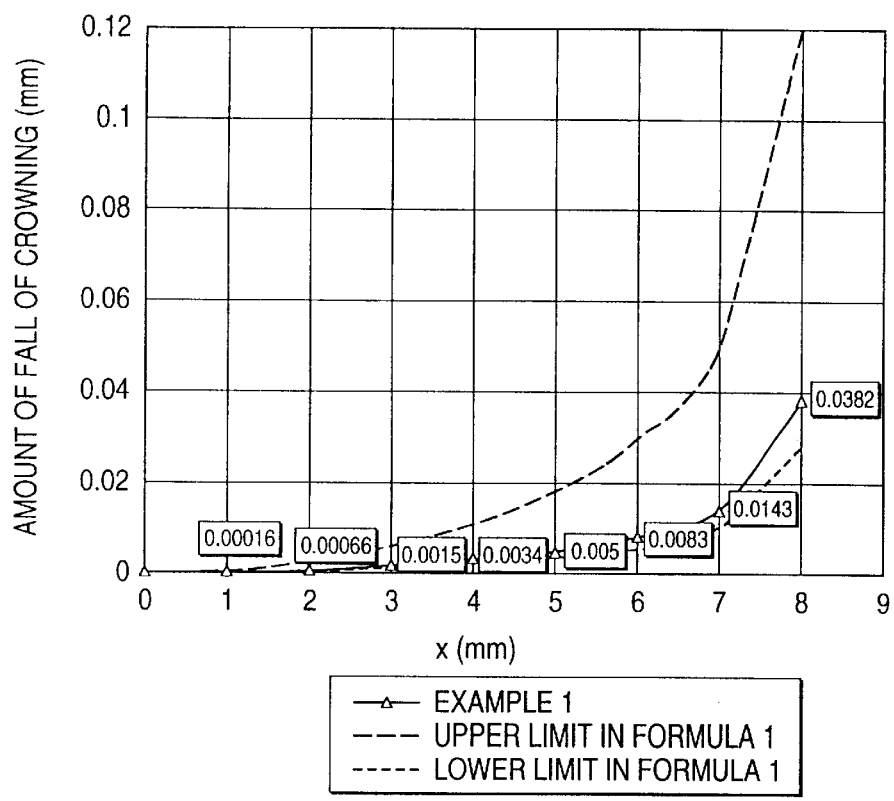
FIGS. 3A and 3B are explanatory diagrams of the crowning profiles of the tappet rollers in Examples 1 and 2.
Figure 3B:
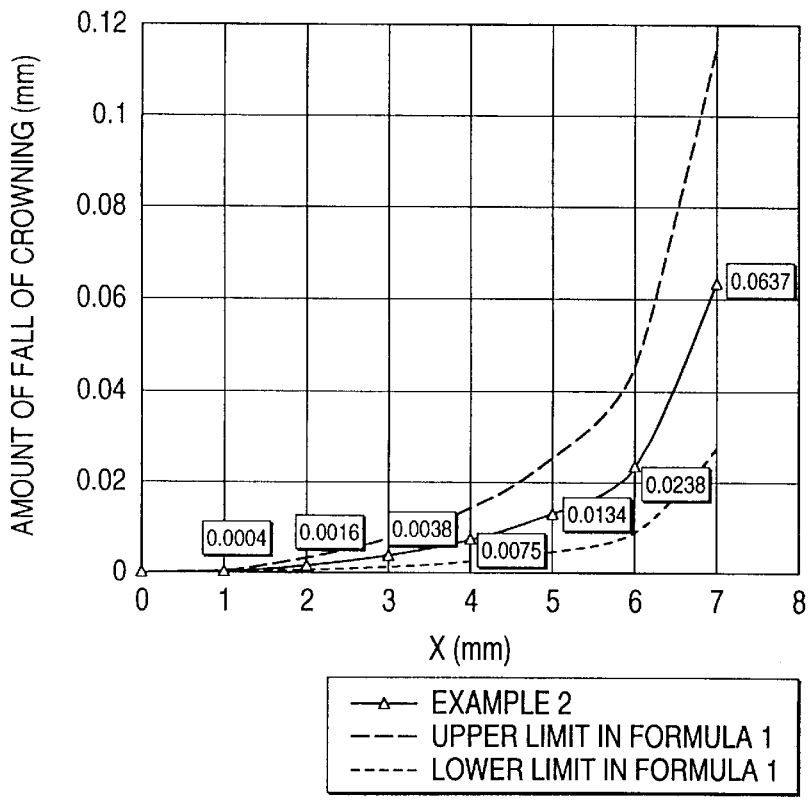

In FIGS. 3A and 3B, an upper limit in Formula (1) above is shown by the broken line, and a lower limit is shown by the dotted line in the relationship between the position x and the amounts $\delta$ of fall of the crowning which are defined as described above. The solid lines in the respective drawings are formed such that, as various examples, by setting the center in the direction of the bus set as the origin, the amount $\delta$ of fall of the crowning for each 1 mm of the effective contact length from the origin and the amount $\delta_{end}$ of fall of the crowning at the aforementioned end point are determined so that a smooth bus shape can be obtained. In FIG. 3A which corresponds to Example 1, the crowning shape is set in the vicinity of the lower limit. In addition, since a value equal to or less than 0.001 mm in this size falls within the range of error as the amount of fall of the crowning, it follows that, as for the amount δ of fall of the crowning in a case where the axial position x=1 mm and x=2 mm with the center in the direction of the bus set as the origin, the lower limit value can be set to 0, and the upper limit value can be set to 0.001 mm. In addition, in FIG. 3B which corresponds to Example 2, the crowning shape is set at a substantially intermediate value between the upper limit and the lower limit. Similarly, the amount δ of fall of the crowning in a case where the axial position x=1 mm may be not less than 0 and not more than 0.001.

Figure 4A:
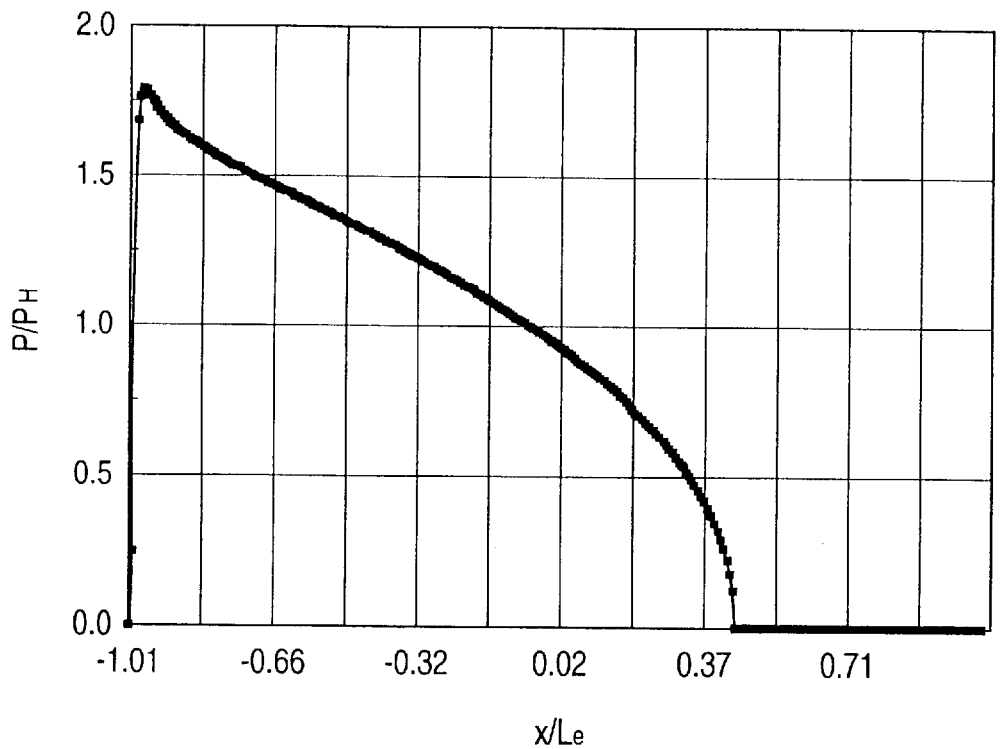
FIGS. 4A and 4B are explanatory diagrams on the distribution of the bearing pressure of the tappet roller shown in FIGS. 3A and 3B.
Figure 4B:
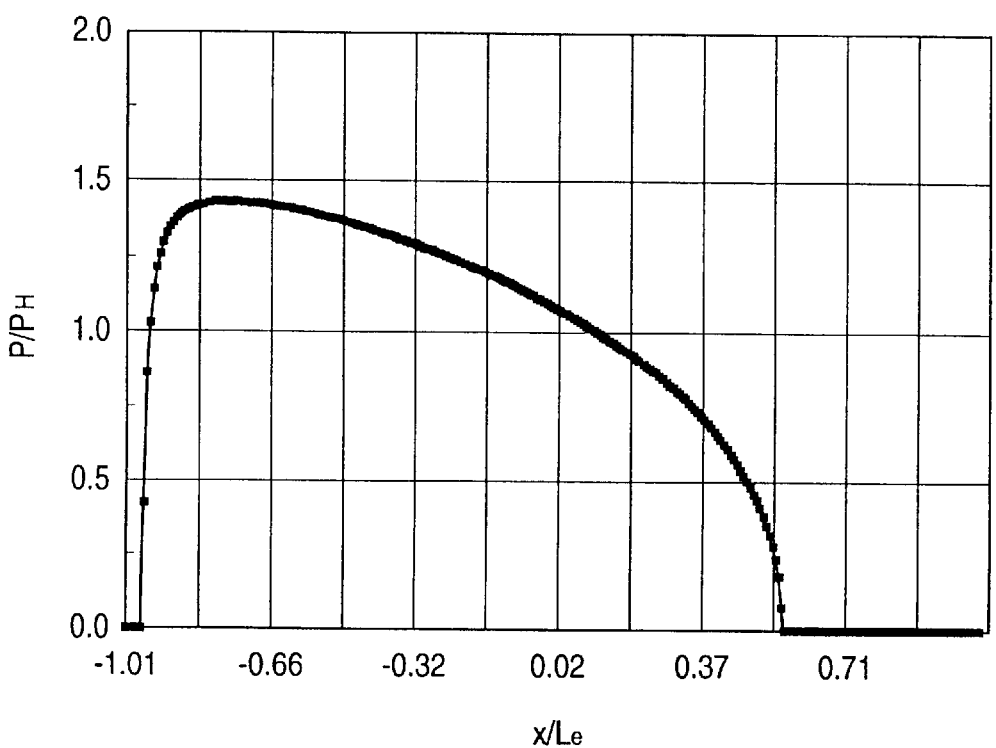
Figure 10:
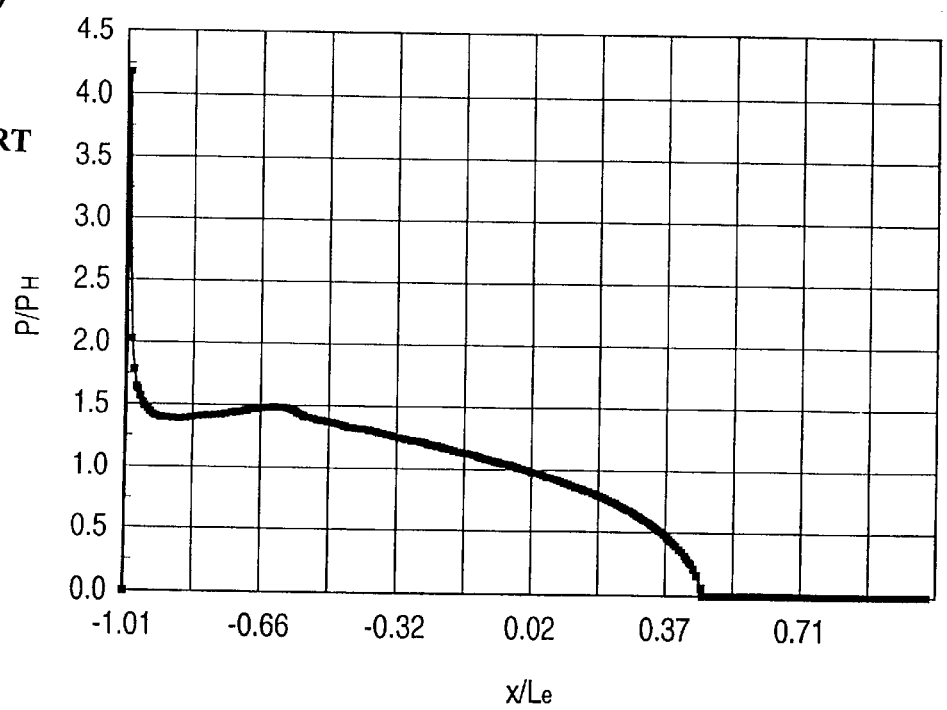
FIG. 10 is an explanatory diagram of the distribution of the bearing pressure of the tappet roller shown in FIG. 9.

In these examples, the bearing pressure distribution when the inclination of the tappet roller with respect to the cam was 5/1000 was analyzed. The results of each analysis are shown in FIGS. 4A and 4B. FIG. 4A corresponds to Example 1 shown in FIG. 3A, and FIG. 4B corresponds to Example 2 shown in FIG. 3B. Further, the abscissa in each drawing shows the ratio of the aforementioned axial position x with the center in the direction of the bus set as the origin to the half $L_e$ of the effective contact length, while the ordinate shows the ratio of bearing pressure P to Hertz's maximum bearing pressure $P_H$. In FIG. 4A corresponding to Example 1, although the gradient of the bearing pressure distribution was slightly large, an edge load such as the one seen in the above-described conventional crowning shape in FIG. 10 cannot be detected. In addition, in FIG. 4B corresponding to Example 2, the gradient of the bearing pressure distribution is gentler, and the edge load is, of course, not detected. As a result, in these two examples, it was possible to continue the stable rotation of the internal combustion engine without causing damage such as wear, seizure, and exfoliation.

Figure 5:
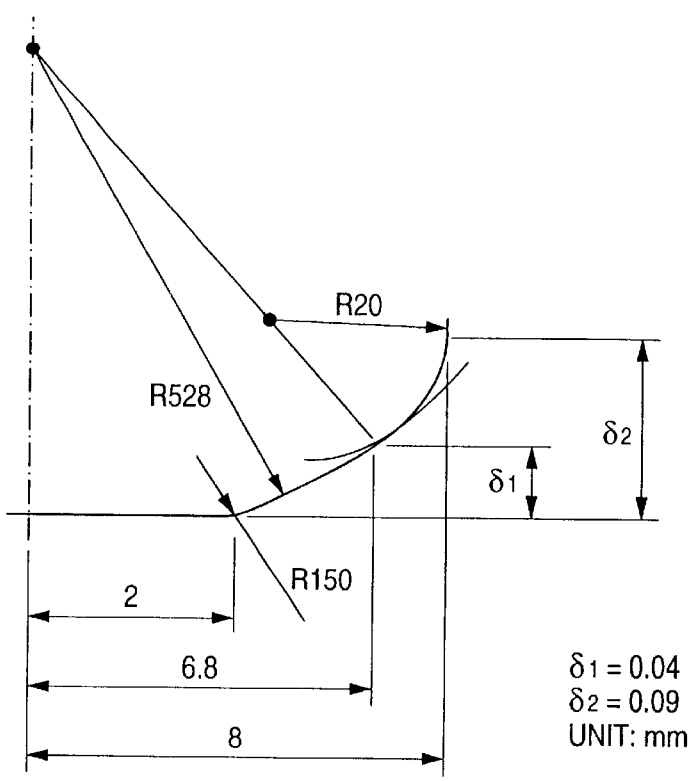
FIG. 5 is an explanatory diagram of the crowning profile of the tappet roller in Example 3.

Next, as Example 3 of the invention, the tappet roller was provided with crowning by combining circular arc crownings, as shown in FIG. 5. The specifications of this tappet roller and the cam were similar to those of Examples 1 and 2 described above, and both of them were formed of a bearing steel. The crowning of tappet roller was the so-called partial crowning in which a circular arc crowning was provided on the outer side from the axial position x=2 with the center in the direction of the bus set as the origin. The crowning was provided such that the radius of curvature of the circular arc crowning from that position was 528 mm, and a circular arc crowning with a radius of curvature of 20 mm was further provided on its outer side, such that the amount $\delta_{end}$ ($\delta_2$ in the drawing) of fall of the crowning at the end point of the effective contact line length became 0.09 mm. Consequently, the amount δ ($\delta_1$ in the drawing) of fall of the crowning at the position x=6.8 mm where the axial position x with the center in the direction of the bus set as the origin was 0.85-fold the half $L_e$ of the effective contact length became 0.04 mm. In addition, at a connecting portion between the circular crowning having the radius of curvature of 528 mm and the straight-line portion, a circular arc with a radius of curvature of 150 mm was used to connect the two portions smoothly. In the combination of the tappet roller and the cam, the amount δ of fall of the crowning at x=0.85$L_e$ (=6.8 mm) in the aforementioned Formula (2-1) was not less than 0.009 mm and not more than 0.045 mm, and similarly the amount δ of fall of the crowning at x=1.0$L_e$ (=8 mm) in the aforementioned Formula 2-2 was not less than 0.028 mm and not more than 0.119 mm, so that the crowning profile in the examples satisfy the two conditions.

Figure 6:
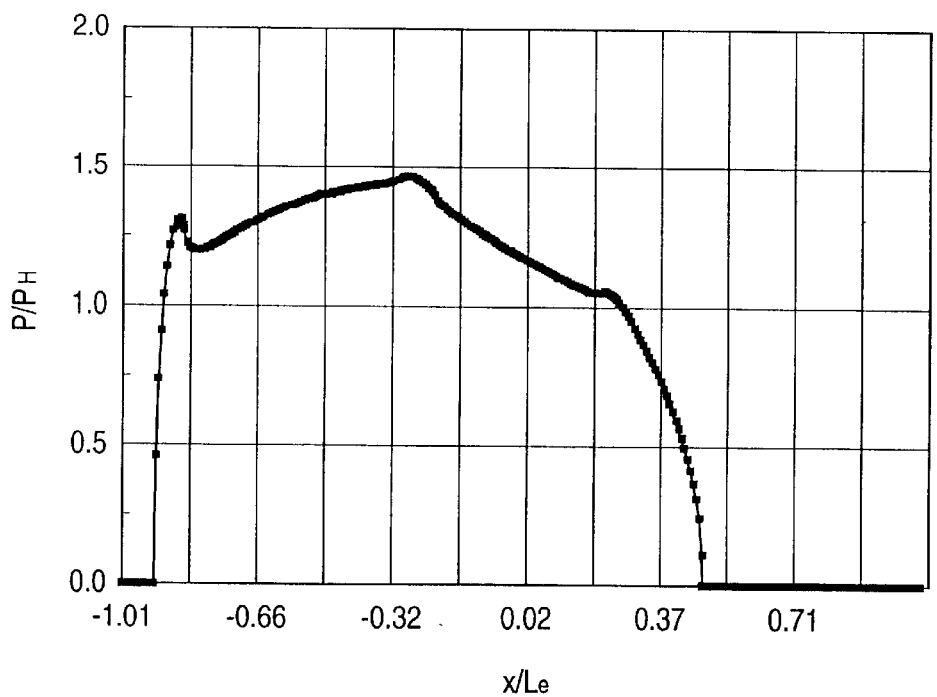
FIG. 6 is an explanatory diagram on the distribution of the bearing pressure of the tappet roller shown in FIG. 5.

With respect to this Example 3, the bearing pressure distribution when the inclination of the tappet roller with respect to the cam was 5/1000 was analyzed. The results of analysis are shown in FIG. 6. The abscissa in the drawing shows the ratio of the aforementioned axial position x with the center in the direction of the bus set as the origin to the half $L_e$ of the effective contact length, while the ordinate shows the ratio of bearing pressure P to Hertz's maximum bearing pressure $P_H$. As is apparent from the drawing, the increase in the bearing pressure is small, and the edge load cannot be detected. As a result, in this Example 3, it was possible to continue the stable rotation of the internal combustion engine without causing damage such as wear, seizure, and exfoliation.

Figure 7:
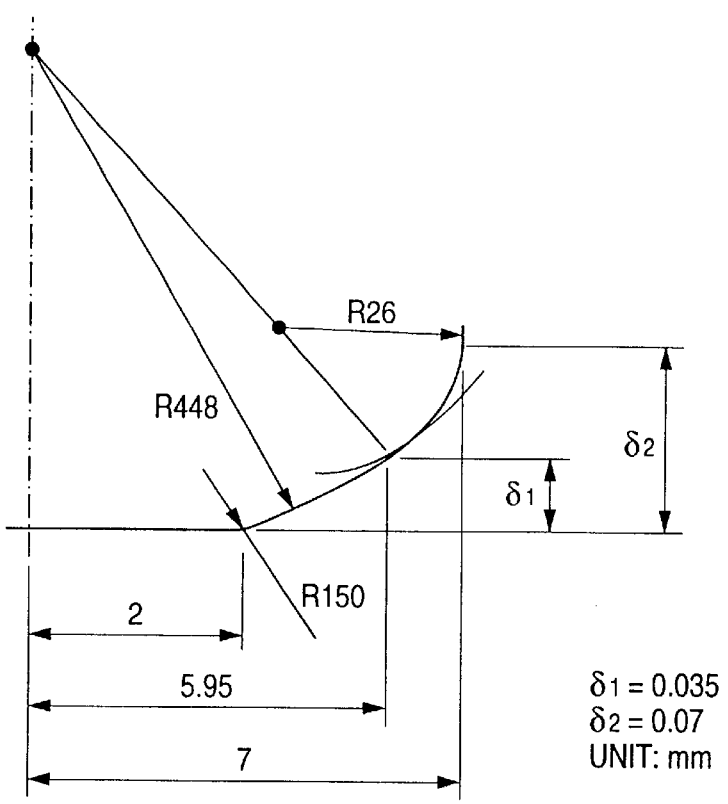
FIG. 7 is an explanatory diagram of the crowning profile of the tappet roller in Example 4.

Next, as Example 4 of the invention, the tappet roller was provided with crowning by combining circular arc crownings, as shown in FIG. 7. Both of this tappet roller and the cam were formed of a bearing steel. The tappet roller had an outer diameter of 40 mm, an inner diameter of 20 mm, and an effective contact length of 14 mm, and the half $L_e$ of the effective contact length was 7 mm. Meanwhile, a minimum value of the radius of curvature of the outer diameter of the cam 1 was 25 mm. The crowning of tappet roller was also the so-called partial crowning in which a circular arc crowning was provided on the outer side from the axial position x=2 with the center in the direction of the bus set as the origin. The crowning was provided such that the radius of curvature of the circular arc crowning from that position was 448 mm, and a circular arc crowning with a radius of curvature of 26 mm was further provided on its outer side, such that the amount $\delta_{end}$ ($\delta_2$ in the drawing) of fall of the crowning at the end point of the effective contact line length became 0.07 mm. Consequently, the amount δ ($\delta_1$ in the drawing) of fall of the crowning at the position x=5.95 mm where the axial position x=2 with the center in the direction of the bus set as the origin was 0.85-fold the half $L_e$ of the effective contact length became 0.035 mm. In addition, at a connecting portion between the circular crowning having the radius of curvature of 448 mm and the straight-line portion, a circular arc with a radius of curvature of 150 mm was used to connect the two portions smoothly. In the combination of the tappet roller and the cam, the amount δ of fall of the crowning at x=0.85$L_e$ (=5.95 mm) in the aforementioned Formula 2-1 was not less than 0.009 mm and not more than 0.044 mm, and similarly the amount δ of fall of the crowning at x=1.0$L_e$ (=8 mm) in the aforementioned Formula (2-2) was not less than 0.027 mm and not more than 0.115 mm, so that the crowning profile in the examples satisfy the two conditions.

Figure 8:
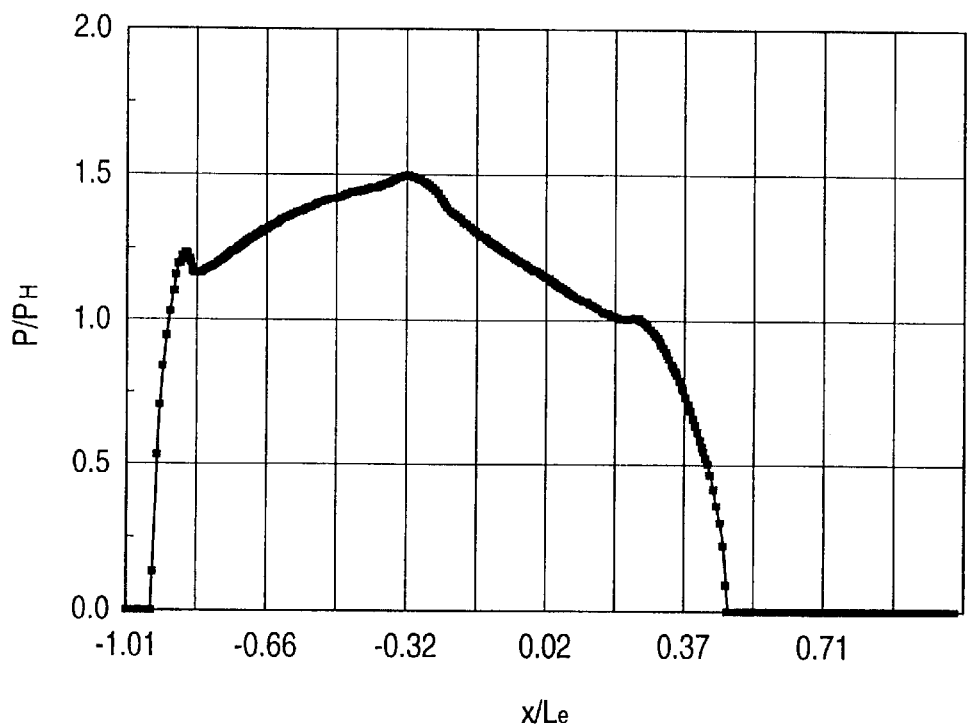
FIG. 8 is a an explanatory diagram on the distribution of the bearing pressure of the tappet roller shown in FIG. 7.
Figure 9:
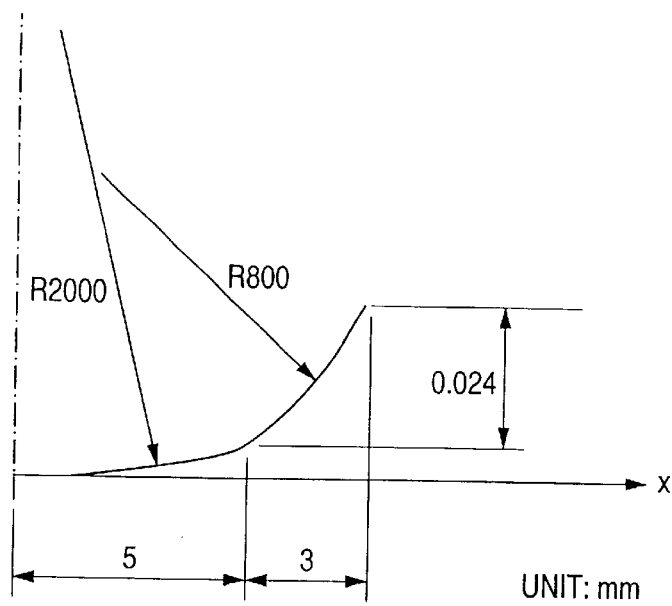
FIG. 9 is an explanatory diagram of a crowning profile illustrating an example of the conventional tappet roller.

With respect to this Example 4, the bearing pressure distribution when the inclination of the tappet roller with respect to the cam was 5/1000 was analyzed. The results of analysis are shown in FIG. 8. The abscissa in the drawing shows the ratio of the aforementioned axial position x with the center in the direction of the bus set as the origin to the half $L_e$ of the effective contact length, while the ordinate shows the ratio of bearing pressure P to Hertz's maximum bearing pressure $P_H$. As is apparent from the drawing, the increase in the bearing pressure is small, and the edge load cannot be detected. As a result, in this Example 3, it was possible to continue the stable rotation of the internal combustion engine without causing damage such as wear, seizure, and exfoliation.

As described above, in accordance with the rolling-contact cylindrical element such as the tappet roller of the invention, by defining the crowning profile or a portion thereof in the effective contact length, even if an inclination occurs with respect to the cam, it is possible to suppress an increase in the bearing pressure and suppress and prevent damage such as wear, seizure, and exfoliation, thereby making it possible to ensure the performance of the internal combustion engine.

What is claimed is:

1. A rolling-contact cylindrical element which abuts against a mating element having a surface with a radius of curvature and is axially supported rotatably so as to come into rolling contact with the mating element at its outer peripheral surface, wherein a crowning is provided on the outer peripheral surface for abutment against the mating element, and if it is assumed that a half of the effective contact length of the outer peripheral surface in a direction of a bus of the outer peripheral surface is $L_e$, a shape of the bus of the crowning is provided such that an amount $\delta$ of fall of the crowning at an axial position x toward an axial end of the rolling-contact cylindrical element from a center in a direction of the bus of the abutment surface of the rolling-contact cylindrical element set as an origin satisfies a following formula (1):

If $-L_e \leq x \leq L_e$, $$-\frac{8.6 \times 10^6}{E'^2} \cdot \frac{r_1 \cdot r_2}{r_1 + r_2} \ln\left\{1 - \left(1 - \frac{1780}{E'} \cdot \frac{r_1 \cdot r_2}{r_1 + r_2} \cdot \frac{1}{L_e}\right)\right. \quad (1)$$

$$\left.\left(\frac{x}{L_e}\right)^2\right\} \leq \delta \leq -\frac{45 \times 10^6}{E'^2} \cdot \frac{r_1 \cdot r_2}{r_1 + r_2} \ln\left\{1 - \left(1 - \frac{3650}{E'} \cdot \frac{r_1 \cdot r_2}{r_1 + r_2} \cdot \frac{1}{L_e}\right)\right.$$

$$\left.\left(\frac{x}{L_e}\right)^2\right\}$$

where, $1/E' = (1-v_1^2)/E_1 + (1-v2^2)/E_2$ $E_1$: modulus of longitudinal elasticity of the material of the rolling-contact cylinder $E_2$: modulus of longitudinal elasticity of the material of the mating element $v_1$: Poisson's ratio of the material of the rolling-contact cylinder $v_2$: Poisson's ratio of the material of the mating element $r_1$: outer radius of the rolling-contact cylindrical element of the mating surface abutting against the mating element $r_2$: minimum value of the radius of curvature of a projection portion of the mating element at its outer peripheral surface ln: natural logarithmic function.

2. The rolling-contact cylindrical element according to claim 1, wherein the mating element having the surface with the radius of curvature is a cam with an outer peripheral surface, and the rolling-contact cylindrical element is a tappet roller which is axially supported rotatably and abuts against and rolls on the outer peripheral surface of the cam.

3. The rolling-contact cylindrical element according to claim 1, wherein $\delta$ in the Formula (1) satisfies the relationship of the Formula (1) when x=±0.85$L_e$ and ±1.0$L_e$.

4. The rolling-contact cylindrical element according to any one of claims 1 to 3, wherein the shape of the crowning is selected from among shapes of crownings including a single circular arc crowning, a trapezoidal crowning, and a crowning combining circular arcs.

* * * * *